United States Patent
Mital et al.

(10) Patent No.: US 8,949,582 B2
(45) Date of Patent: Feb. 3, 2015

(54) CHANGING A FLOW IDENTIFIER OF A PACKET IN A MULTI-THREAD, MULTI-FLOW NETWORK PROCESSOR

(71) Applicant: LSI Corporation, Milpitas, CA (US)

(72) Inventors: Deepak Mital, Orefield, PA (US); James Clee, Orefield, PA (US); Jerry Pirog, Easton, PA (US); Te Khac Ma, Allentown, PA (US); Steven J. Pollock, Allentown, PA (US)

(73) Assignee: LSI Corporation, San Jose, CA (US)

( * ) Notice: Subject to any disclaimer, the term of this patent is extended or adjusted under 35 U.S.C. 154(b) by 236 days.

(21) Appl. No.: 13/687,911

(22) Filed: Nov. 28, 2012

(65) Prior Publication Data

US 2013/0089098 A1    Apr. 11, 2013

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of (Continued)

(51) Int. Cl.
*G06F 9/455* (2006.01)
*G06F 9/46* (2006.01)
*H04L 29/06* (2006.01)
(Continued)

(52) U.S. Cl.
CPC .............. *H04L 69/22* (2013.01); *H04L 49/109* (2013.01); *G06F 15/167* (2013.01); *H04L 49/506* (2013.01); *H04L 49/101* (2013.01); *H04L 49/00* (2013.01)
USPC ........................................... 712/220; 370/394

(58) Field of Classification Search
None
See application file for complete search history.

(56) References Cited

U.S. PATENT DOCUMENTS 4,123,795 A    10/1978    Dean, Jr. et al.
4,622,631 A    11/1986    Frank et al.
(Continued)

FOREIGN PATENT DOCUMENTS

JP    H02-271444    11/1990

OTHER PUBLICATIONS

Alan H. Karp and Rajiv Gupta, "Hardware Assist for Data Merging for Shared Memory Multiprocessors", Hewlett-Packard Labs, Palo Alto, CA, Mar. 13, 1994.

(Continued)

*Primary Examiner* — Corey S Faherty (57) ABSTRACT

Described embodiments classify packets received by a network processor. A processing module of the network processor generates tasks corresponding to each received packet. A packet classification processor determines, independent of a flow identifier of the received task, control data corresponding to each task. A multi-thread instruction engine processes threads of instructions corresponding to received tasks, each task corresponding to a packet flow of the network processor and maintains a thread status table and a sequence counter for each flow. Active threads are tracked by the thread status table, and each status entry includes a sequence value and a flow value identifying the flow. Each sequence counter generates a sequence value for each thread by incrementing the sequence counter each time processing of a thread for the associated flow is started, and decrementing the sequence counter each time a thread for the associated flow is completed.

20 Claims, 5 Drawing Sheets

Related U.S. Application Data application No. 12/782,411, filed on May 18, 2010, now Pat. No. 8,407,707.

(60) Provisional application No. 61/564,811, filed on Nov. 29, 2011.

(51) Int. Cl.
*H04L 12/933* (2013.01)
*G06F 15/167* (2006.01)
*H04L 12/931* (2013.01)

(56) References Cited

U.S. PATENT DOCUMENTS

| | | |
|---|---|---|
| 5,394,534 A | 2/1995 | Kulakowski et al. |
| 5,623,698 A | 4/1997 | Stephenson et al. |
| 5,838,931 A | 11/1998 | Regenold et al. |
| 5,892,766 A | 4/1999 | Wicki et al. |
| 5,893,120 A | 4/1999 | Nemes |
| 5,909,695 A | 6/1999 | Wong et al. |
| 5,943,283 A | 8/1999 | Wong et al. |
| 5,974,421 A | 10/1999 | Krishnaswamy et al. |
| 6,026,467 A | 2/2000 | Petty |
| 6,038,630 A | 3/2000 | Foster et al. |
| 6,052,697 A | 4/2000 | Bennett et al. |
| 6,115,802 A | 9/2000 | Tock et al. |
| 6,195,335 B1 | 2/2001 | Calvignac et al. |
| 6,216,167 B1 | 4/2001 | Momirov |
| 6,233,246 B1 | 5/2001 | Hareski et al. |
| 6,289,013 B1 | 9/2001 | Lakshman et al. |
| 6,341,130 B1 | 1/2002 | Lakshman et al. |
| 6,567,564 B1 | 5/2003 | van der Wal |
| 6,584,546 B2 | 6/2003 | Kavipurapu |
| 6,636,932 B1 | 10/2003 | Regev et al. |
| 6,658,012 B1 | 12/2003 | Baucom, Jr. et al. |
| 6,839,830 B2 | 1/2005 | Liu |
| 6,907,469 B1 | 6/2005 | Gallo et al. |
| 6,914,882 B2 | 7/2005 | Merani et al. |
| 7,058,057 B2 | 6/2006 | Dooley et al. |
| 7,085,911 B2 | 8/2006 | Sachedina et al. |
| 7,089,346 B2 | 8/2006 | Cebulla et al. |
| 7,159,219 B2 | 1/2007 | Chen et al. |
| 7,234,018 B1 | 6/2007 | Purcell et al. |
| 7,287,046 B2 | 10/2007 | Bulka et al. |
| 7,397,809 B2 | 7/2008 | Wang |
| 7,453,898 B1 | 11/2008 | Cohen et al. |
| 7,461,208 B1 | 12/2008 | Caprioli et al. |
| 7,461,407 B2 | 12/2008 | Little et al. |
| 7,512,740 B2 | 3/2009 | Diefendorff |
| 7,519,065 B2 | 4/2009 | Angle et al. |
| 7,554,464 B1 | 6/2009 | Oberdorfer |
| 7,594,028 B1 | 9/2009 | Jacobs et al. |
| 7,596,142 B1 | 9/2009 | MacAdam |
| 7,600,078 B1 | 10/2009 | Cen et al. |
| 7,659,894 B2 | 2/2010 | Keller et al. |
| 7,660,259 B1 | 2/2010 | Grosser et al. |
| 7,710,988 B1 | 5/2010 | Tripathi et al. |
| 7,720,055 B2 | 5/2010 | Kadambi et al. |
| 7,849,315 B2 | 12/2010 | Hardy et al. |
| 7,886,150 B2 | 2/2011 | Stollon et al. |
| 8,127,350 B2 | 2/2012 | Wei et al. |
| 8,140,759 B2 | 3/2012 | Frey et al. |
| 8,255,644 B2 * | 8/2012 | Sonnier et al. ............... 711/154 |
| 8,321,385 B2 * | 11/2012 | Burroughs et al. ........... 707/692 |
| 2002/0029214 A1 | 3/2002 | Yianilos et al. |
| 2002/0085545 A1 * | 7/2002 | Ku et al. ...................... 370/369 |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0141537 A1 | 6/2005 | Kumar et al. |
| 2005/0152352 A1 | 7/2005 | Jun et al. |
| 2006/0029079 A1 | 2/2006 | Cohen et al. |
| 2006/0256783 A1 | 11/2006 | Ayrapetian et al. |
| 2007/0006233 A1 * | 1/2007 | Finger et al. ................. 718/100 |
| 2007/0011396 A1 | 1/2007 | Singh et al. |
| 2007/0016756 A1 | 1/2007 | Hsieh et al. |
| 2007/0043856 A1 | 2/2007 | Morris et al. |
| 2007/0226798 A1 | 9/2007 | Sibert |
| 2007/0271374 A1 | 11/2007 | Shomura et al. |
| 2008/0077928 A1 | 3/2008 | Matsuzaki et al. |
| 2008/0092092 A1 | 4/2008 | Dalton et al. |
| 2008/0162793 A1 | 7/2008 | Chu et al. |
| 2008/0239992 A1 | 10/2008 | Krasnyanskiy |
| 2008/0240103 A1 | 10/2008 | Schmidt |
| 2008/0240106 A1 | 10/2008 | Schlenk |
| 2009/0019270 A1 | 1/2009 | Halter et al. |
| 2009/0271562 A1 | 10/2009 | Sinclair |
| 2010/0260198 A1 | 10/2010 | Rojas-Cessa et al. |
| 2011/0219195 A1 | 9/2011 | Habusha et al. |
| 2012/0020250 A1 * | 1/2012 | Sundararaman et al. ..... 370/256 |
| 2012/0023498 A1 * | 1/2012 | Sundararaman et al. ..... 718/102 |

OTHER PUBLICATIONS

Sundaram, Chandra, Goyal, Shenoy, Sahni, Vin. "Application Performance in the QLinux Multimedia Operating System", ACM Multimedia, Los Angeles, CA (2000).

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Real-time Energy Aware Packet Scheduling", IEEE, Nov. 2001.

Chiueh et al., "High-Performance IP Routing Table Lookup Using CPU Caching", IEEE (1999).

* cited by examiner

CHANGING A FLOW IDENTIFIER OF A PACKET IN A MULTI-THREAD, MULTI-FLOW NETWORK PROCESSOR

CROSS-REFERENCE TO RELATED APPLICATIONS

This application claims the benefit of the filing date of U.S. provisional application No. 61/564,811 filed Nov. 29, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010, now issued as U.S. Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687.719 filed Nov. 28, 2012, Ser. No. 13/687,772 filed Nov. 28, 2012, Ser. No. 13/687,865 filed Nov. 28, 2012, Ser. No. 13/687,958 filed Nov. 2, 2012, and Ser. No. 13/687,971 filed Nov. 28, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

Network processors typically employ a flow identifier (flowID) of packets to maintain operation ordering within the network processor and packet transmission by the network processor. Typically, the flowID is determined based on the contents of the packet, which might require the network processor to inspect the packet and loopback the packet to the input queues of the network processor, thus resulting in delay and inefficiency in processing received packets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments classify packets received by a network processor. A processing module of the network processor generates tasks corresponding to each received packet. A packet classification processor determines, independent of a flow identifier of the received task, control data corresponding to each task. A multi-thread instruction engine processes threads of instructions corresponding to received tasks, each task corresponding to a packet flow of the network processor and maintains a thread status table and a sequence counter for each flow. Active threads are tracked by the thread status table, and each status entry includes a sequence value and a flow value identifying the flow. Each sequence counter generates a sequence value for each thread by incrementing the sequence counter each time processing of a thread for the associated flow is started, and decrementing the sequence counter each time a thread for the associated flow is completed. A lower relative sequence value indicates an earlier started thread for the flow. The multi-thread instruction engine processes instructions in the order in which the threads were started for each flow, without head-of-line blocking among flows. A reflow operation modifies the flow value of a thread after the task is received by the packet classification processor, while maintaining the control data corresponding to the received task. The sequence value of the reflowed task is updated corresponding to the modified flow value.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Described embodiments classify packets received by a network processor. A processing module of the network processor generates tasks corresponding to each received packet. A packet classification processor determines, independent of a flow identifier of the received task, control data corresponding to each task. A multi-thread instruction engine processes threads of instructions corresponding to received tasks, each task corresponding to a packet flow of the network processor and maintains a thread status table and a sequence counter for each flow. Active threads are tracked by the thread status table, and each status entry includes a sequence value and a flow value identifying the flow. Each sequence counter generates a sequence value for each thread by incrementing the sequence counter each time processing of a thread for the associated flow is started, and decrementing the sequence counter each time a thread for the associated flow is completed. A lower relative sequence value indicates an earlier started thread for the flow. The multi-thread instruction engine processes instructions in the order in which the threads were started for each flow, without head-of-line blocking among flows. A reflow operation modifies the flow value of a thread after the task is received by the packet classification processor, while maintaining the control data corresponding to the received task. The sequence value of the reflowed task is updated corresponding to the modified flow value.

Table 1 defines a list of acronyms employed throughout this specification as an aid to understanding the described embodiments:

TABLE 1

| AMBA | Advanced Microcontroller Bus Architecture | AXI | Advanced eXtensible Interface |
| --- | --- | --- | --- |
| CAM | Content Addressable Memory | CCL | Classification Completion List |
| CPU | Central Processing Unit | CRC | Cyclic Redundancy Check |
| DDR | Double Data Rate | DMA | Direct Memory Access |
| DRAM | Dynamic Random Access Memory | ECC | Error Correction Code |
| eDRAM | Embedded DRAM | FC | Fibre Channel |
| FIFO | First-In, First-Out | flow ID | Flow IDentifier |
| FSM | Finite State Machine | I/O | Input/Output |
| IP | Internet Protocol | LRU | Least Recently Used |
| LSB | Least Significant Bit | µP | Microprocessor |
| MMB | Memory Manager Block | MPP | Modular Packet Processor |
| MTM | Modular Traffic Manager | OUL | Oldest Unspecified List |
| OQ | Output Queue | PAB | Packet Assembly Block |
| PCI-E | Peripheral Component Interconnect Express | PDU | Protocol Data Unit |
| PLB | Processor Local Bus | PIC | Packet Integrity Checker |
| PQM | Per-Queue Modifier | RF | Radio Frequency |
| SAS | Serial Attached SCSI | SATA | Serial Advanced Technology Attachment |
| SCH | Scheduler | SCSI | Small Computer System Interface |
| SED | Stream Editor | SoC | System-on-Chip |
| SPP | Security Protocol Processor | SRIO | Serial Rapid I/O |
| TCP | Transmission Control Protocol | THID | THread IDentifier |
| TS | Thread Start | TID | Task IDentifier |
| USB | Universal Serial Bus | | |

Figure 1:
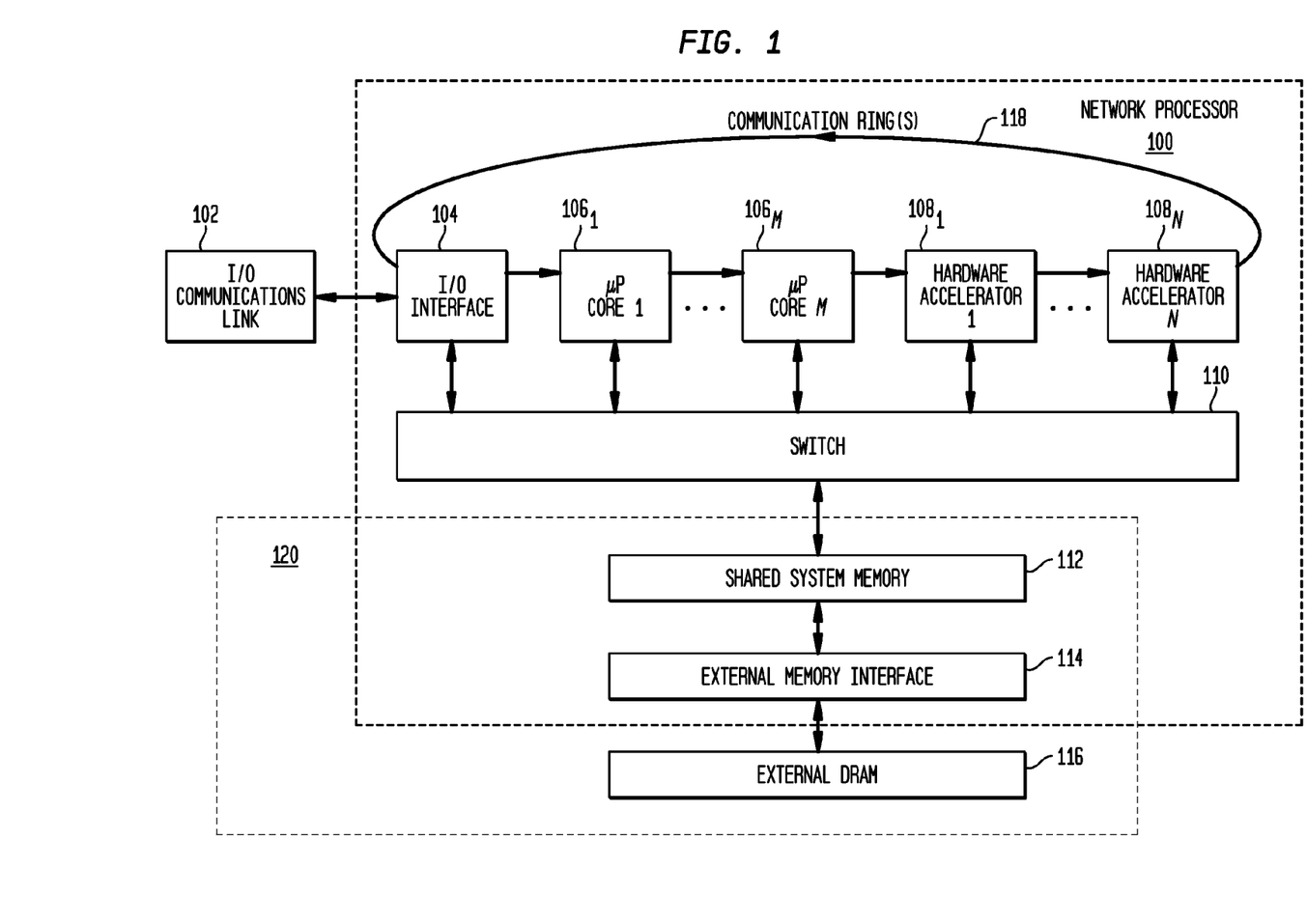
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores 106$_1$-106$_M$, and one or more hardware accelerators 108$_1$-108$_N$, where M and N are integers greater than or equal to 1. Network processor 100 also includes external memory interface 114 for communication with external memory 116. Shared memory 112 might be implemented as embedded dynamic random-access memory (eDRAM) internal to network processor 100. External memory 116 might typically be implemented as a double-data-rate (e.g., DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. No. 12/782,379, 12/782,393, and Ser. No. 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250, 898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Figure 2:
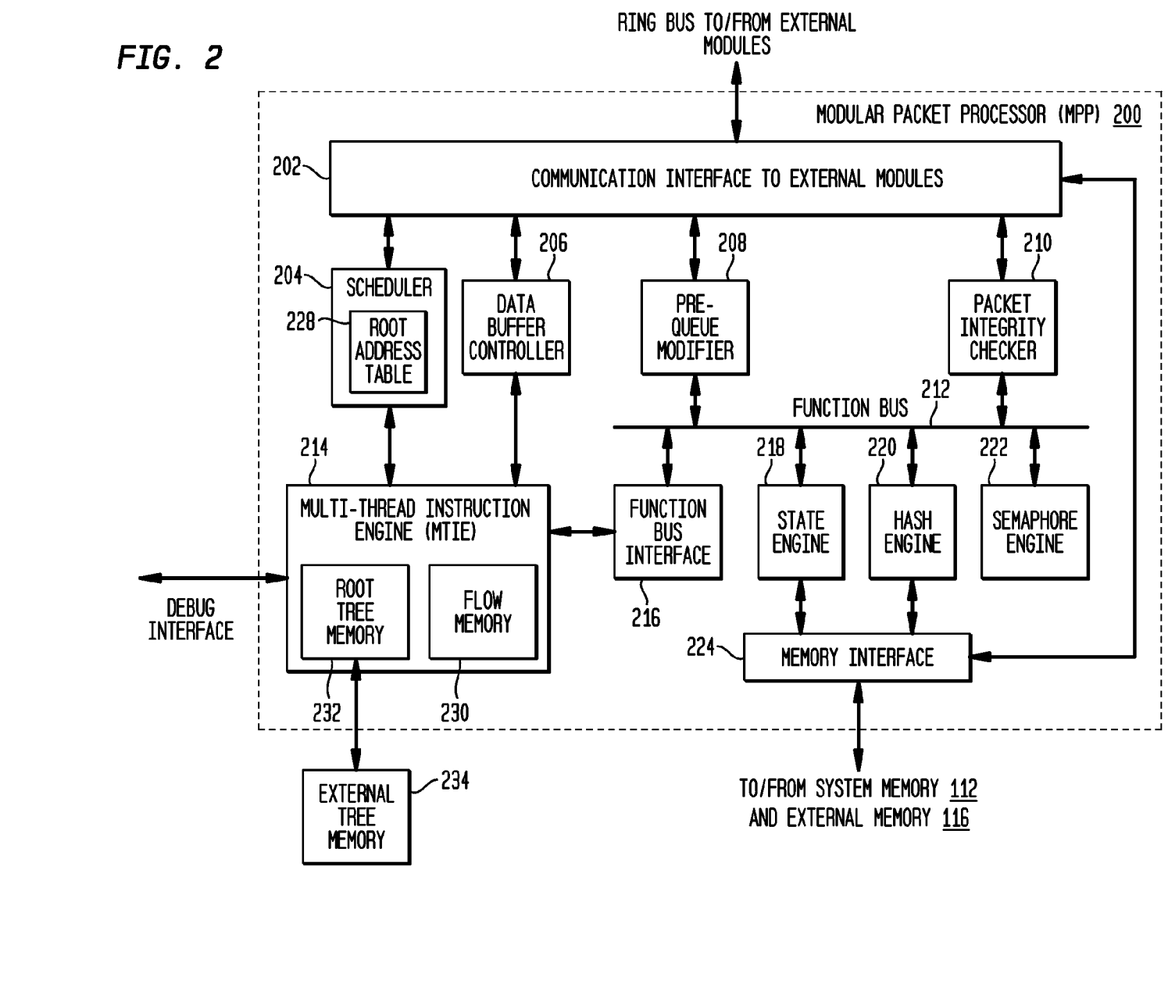
FIG. 2 shows a block diagram of a modular packet processor submodule of the network processor of FIG. 1 in accordance with exemplary embodiments.

FIG. 2 shows a block diagram of an exemplary MPP 200, in accordance with embodiments of the present invention. MPP 200 might receive an input task from any µP core or accelerator (e.g., µP cores 106 or accelerators 108) of network processor 100. MPP 200 performs operations specified by the input task on a data packet stored in at least one of shared memory 112 and external memory 116. When MPP 200 is finished operating on the data packet, MPP 200 might generate an output task to another µP core or accelerator of network processor 100, for example, a next µP core or accelerator specified for a given virtual flow identifier.

As described herein, MPP 200 might generally be employed as a packet classification engine in network processor 100. In general, packet classification categorizes packets into classes, for example, based on port number or protocol. Each resulting packet class might be treated differently to control packet flow, for example, each packet class might be subject to a different rate limit or prioritized differently relative to other packet classes. Classification is achieved by various means. Matching bit patterns of data to those of known protocols is a simple, yet widely-used technique. More advanced traffic classification techniques rely on statistical analysis of attributes such as byte frequencies, packet sizes and packet inter-arrival times. Upon classifying a traffic flow using a particular protocol, a predetermined policy can be applied to it and other flows to either guarantee a certain quality (as with VoIP or media streaming service) or to provide best-effort delivery.

As shown in FIG. 2, and as will be described, packet classification might be performed by Multi-thread Instruction Engine (MTIE) 214 of MPP 200. Packet (also Protocol Data Unit or PDU) data modification might be carried out by Pre-Queue Modifier (PQM) 208. A packet integrity check might typically be carried out by Packet Integrity Checker (PIC) 210, such as determining that a packet is properly formed according to a given protocol. PIC 210 might, for example, implement various CRC and checksum functions of MPP 200. Interface to communication interface 202 might provide a standard interface between MPP 200 and chip level connections to external modules of network processor 100, for example by one or more ring communication buses. Semaphore Engine (SEM) 222 implements semaphore logic in MPP 200, to manage atomic access to a hardware resource of network processor 100 and MPP 200. For example, for a context thread to utilize an instance of a hardware resource, the context thread might have to reserve a semaphore for that resource. Hash table operations might be carried out by Hash Engine (HE) 220. HE 220 implements hash engine functionality in MPP 200. HE 220 receives instructions from Function Bus Interface (FBI) 216 over function bus 212. State Engine (SENG) 218 might perform functions of a finite state machine (FSM) that operates on received packets. For example, SENG 218 might perform statistics counts and run traffic shaper scripts.

MPP 200 might generally be implemented as a multi-threaded engine capable of executing parallel functions. The multi-threading operation is performed by multiple contexts in MTIE 214. Some embodiments of MPP 200 might employ more than one MTIE 214 to support additional context processing. For example, MPP 200 might preferably include 4 MTIE cores, each capable of processing 32 contexts, for a total of 128 contexts. These contexts might be supported by 256 task identifiers (TIDs), meaning that contexts for up to 256 tasks might be concurrently active in MPP 200.

MPP 200 might employ a flow identifier (flowID) of packets to maintain operation ordering and packet scheduling. As described herein, MPP 200 might employ the flowID to determine the output packet order of network processor 100 and to order function calls and tasks within various submodules of MPP 200. As described in related U.S. patent application Ser. No. 12/974,477 filed on Dec. 21, 2010 and Ser. No. 13/687,719 filed on Nov. 28, 2012, embodiments might typically employ an Oldest Unspecified List (OUL) to perform ordering.

Figure 3:
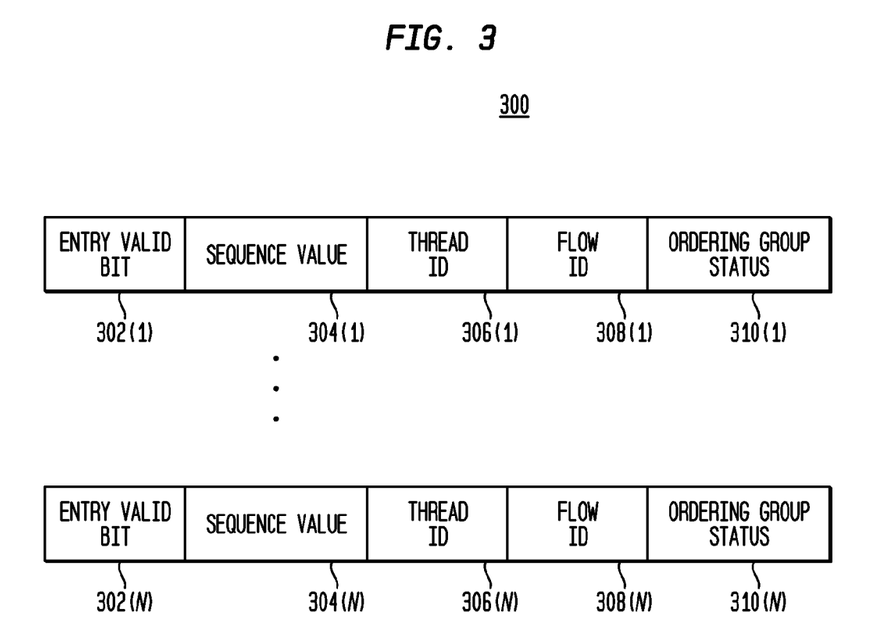
FIG. 3 shows an exemplary block diagram of a thread status data structure (Oldest Unspecified List, "OUL") employed by the packet processor of FIG. 2 in accordance with exemplary embodiments.

FIG. 3 shows an exemplary embodiment of OUL 300 employed by SCH 204 to track the order in which the thread start (TS) indications were received for each thread. The oldest thread in the list is removed after it has specified its output queue (OQ). OUL 300 is an ordered list of thread identifiers (THIDs) for which SCH 204 has received a TS. The oldest entry is not read from OUL 300 until it has specified its OQ. As shown in FIG. 3, OUL 300 tracks up to N currently active threads. OUL 300 includes valid field 302(1)-302(N) to indicate a valid active thread, sequence value field 304(1)-304(N) to track the sequence number of each thread, and thus thread start order, and thread field 306(1)-306(N) to identify which thread corresponds to the respective entry of thread status data structure 300.

MPP 200 might maintain a sequence counter that is incremented each time a new thread is allocated. When a thread is allocated, thread status data structure 300 is updated such that the sequence field (e.g., the corresponding one of 304(1)-304(N)) for the thread is updated with the sequence number. The valid bit (e.g., the corresponding one of 302(1)-302(N)) is set to 1. When the thread is de-allocated, the structure corresponding to the thread is updated. For any thread structure with a sequence value greater or equal to the sequence value of the de-allocated thread, the sequence value is decremented. The valid bit is cleared for the de-allocated thread. The global sequence counter is decremented.

When SCH 204 receives an indication of the start of a thread, SCH 204 records the TS indicator in thread ID field 306 of the corresponding thread in OUL 300. Entries in OUL 300 are written in the order in which the threads are started, and read in the same order. Before, or coincident with when SCH 204 receives the first input packet for a thread, SCH 204 receives an indication of which OQ the thread is to use such as described in related U.S. patent application Ser. No. 12/974,477 filed on Dec. 21, 2010.

As described, OUL 300 tracks the order in which the threads are received by the scheduler of MPP 200. The oldest thread in the list for each flowID is removed from OUL 300 after the thread has an OQ specified. As shown in FIG. 3, OUL 300 also includes flow ID field 308(1)-304(N) to identify which flow corresponds to the respective entry of OUL 300, and thus allowing OUL 300 to independently track thread start order for multiple flows of MPP 200. OUL 300 also includes ordering group status field 310(1)-310(N), which is employed to determine a status of the ordering group for the thread. As described in related U.S. patent application Ser. No. 12/976,228 filed Dec. 22, 2010, FBI 216 might provide function calls to a designated module of MPP 200 for execution via function bus 212 which is employed to communicate between MTIE 214 and HE 220, PIC 210, SEM 222, PQM 208 and SENG 218.

When a new thread is started, MPP 200 associates a flow ID value with the new thread. The flow ID value is stored in flow ID field 308 of OUL 300 when the OUL entry is made for the new thread. Thus, when threads are allocated or deallocated from OUL 300 (e.g., when a thread is received by MPP 200, or when a thread is assigned an output queue by SCH 204, respectively), sequence numbers might be assigned on a per-flowID basis. When a thread is started (allocated) by MPP 200, the thread is assigned a sequence number one larger than the largest sequence number currently valid in OUL 300 (or 0 if none are valid) for the assigned flow ID value. OUL 300 might include up to N counters to track the sequence number for threads in each flow. When a thread is deleted (deallocated), all threads for the same flow having sequence numbers larger than the one being deallocated are decremented by 1. Entries for other flows (and threads for the same flow having sequence numbers smaller than the one being deallocated) are not affected. Thus, the oldest thread in each flow has a sequence number of 0 for each of the N flows.

As an example, OUL 300 might appear as shown in the exemplary case shown in table 2 below. In the exemplary case shown in table 2, three (3) threads are active for flow "A" and 4 threads active for flow "B":

TABLE 2

| Thread Number | Valid | Sequence Number | Flow ID |
|---|---|---|---|
| 127 | 0 | x | x |
| 126 | 0 | x | x |
| 125 | 0 | x | x |
| ... | 0 | x | x |
| 63 | 1 | 1 | A |
| 62 | 1 | 1 | B |
| 61 | 1 | 0 | B |
| 60 | 0 | x | x |
| 59 | 1 | 2 | B |
| 58 | 1 | 2 | A |
| 57 | 1 | 3 | B |
| 56 | 0 | x | x |
| 55 | 1 | 0 | A |
| 54 | 0 | x | x |
| ... | 0 | x | x |
| 0 | 0 | x | x |

Thus, as shown in table 2 above, thread 55 is the oldest processing thread for flow "A", and thread 61 is the oldest processing thread for flow "B", while thread 58 is the newest processing thread for flow "A", and thread 57 is the newest processing thread for flow "B". In an alternative embodiment, OUL 300 might employ a linked list structure with additional sets of pointers for each flow ID. Another embodiment might support thread ordering among "A" flows by employing "A" distinct instances of OUL 300.

For each ordered function request received, FBI 216 checks if the thread associated with the function request is the oldest for the associated flow (e.g., sequence value 304 is equal to 0 for the associated value of flow ID 308). If the thread is not the oldest for the associated flow (e.g., sequence value 304 is not equal to 0 for the associated value of flow ID 308), then FBI 216 checks whether previously received ordered function requests for newer threads have completed. Thus, Flow ID 308 and sequence value 304 are used to identify a next context within the ordering group being processed. As described in related U.S. patent application Ser. No. 13/687,719 filed on Nov. 28, 2012, if the thread is the oldest for the flow, FBI 216 sends out the function request to the corresponding module (e.g., one of HE 220, PIC 210, SEM 222, PQM 208 and SENG 218), and the corresponding ordering group status field is set to '1' to indicate the oldest thread for the associated ordering group is finished. When a received function request is sent out by FBI 216, FBI 216 might also send out other function requests from the pending list that can be sent (e.g., based on the Flow ID and sequence values), until there are no more functions that can be sent from the pending list (e.g., they are blocked by older thread(s) in the associated flow).

Figure 4:
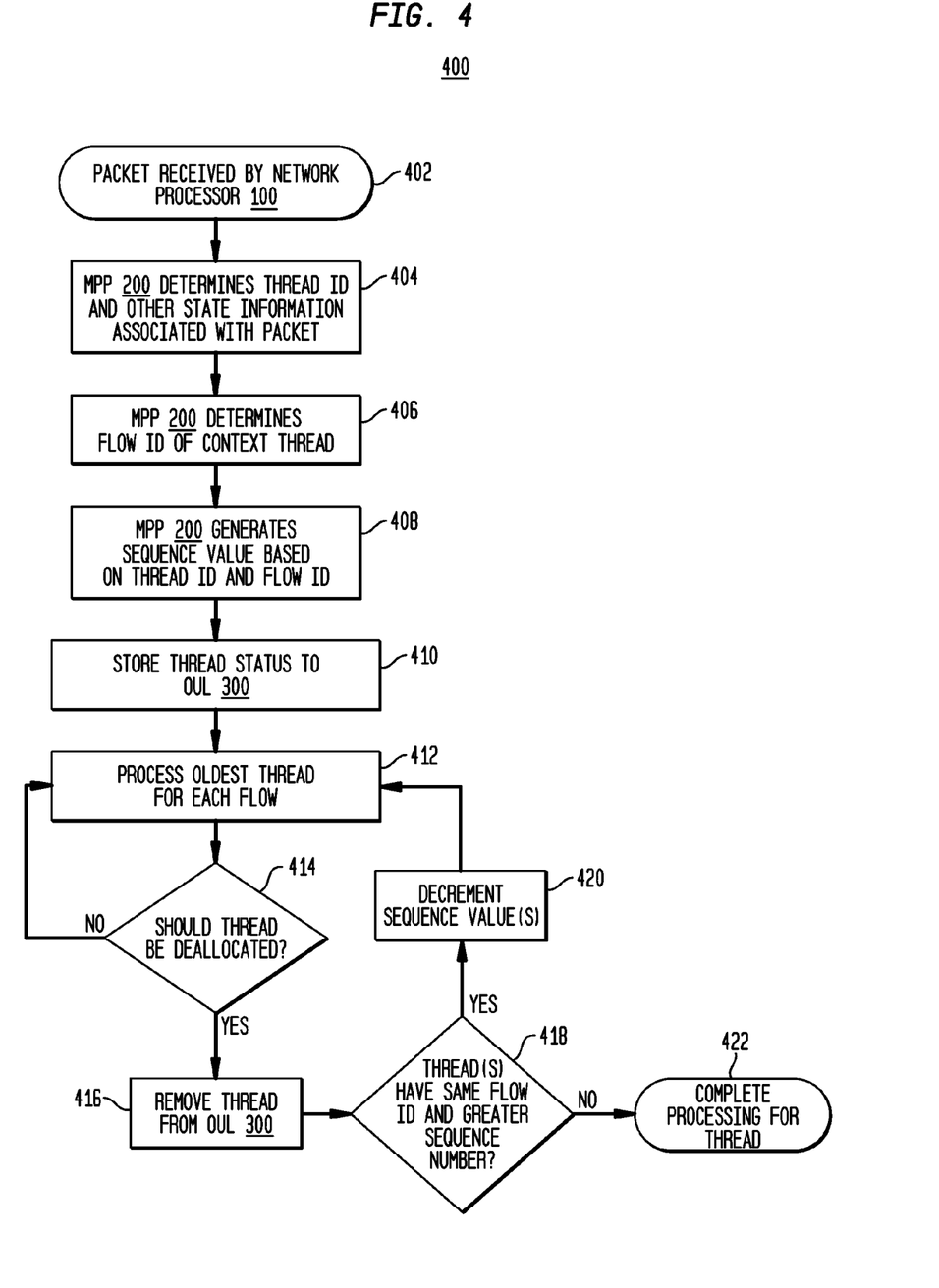
FIG. 4 shows a flow diagram of a thread scheduling process employed by the packet processor of FIG. 2 in accordance with exemplary embodiments.

FIG. 4 shows a flow diagram of thread scheduling process 400. At step 402, a packet is received by network processor 100 and a task is sent to MPP 200 corresponding to the data packet received by network processor 100. At step 404, MPP 200 determines a thread ID value and other state information that is not dependent upon the flowID value associated with the received packet and, at step 406, determines a flow ID value associated with the context. At step 508, based on the determined thread ID value and the determined flow ID value, MPP 200 generates a sequence value corresponding to the context on a per-thread, per-flow basis. At step 510, MPP 200 stores the flow ID value, the thread ID value, the sequence value to an entry in OUL 300 (e.g., entries 304, 306 and 308) and sets corresponding entry valid bit 302. At step 412, the oldest thread for each flow (e.g., the thread having a sequence number of 0 for each flow ID value) is processed by MPP 200 (e.g., by MTIE 214).

At step 414, if a thread should not be deallocated (e.g., processing on the thread is not yet complete), processing on the oldest threads for each flow is performed by MPP 200 at step 412. At step 414, if a thread should be deallocated (e.g., processing on the thread is complete), then process 400 continues to step 416. At step 416, the deallocated thread is removed from OUL 300. At step 418, if any threads have the same flow ID value and sequence numbers larger than the sequence number of the deallocated thread, at step 420 their corresponding sequence numbers are decremented by 1. Process 400 returns to step 412 to continue processing the oldest thread (e.g., having a sequence number of 0) for each flow ID value. At step 418, if any threads do not have the same flow ID value, or have the same flow ID value and sequence numbers less than the sequence number of the deallocated thread, at step 422 the threads for other flow ID values and threads for the same flow ID having sequence numbers less than the one being deallocated are not changed, and thread processing is complete.

In accordance with described embodiments, MPP 200 might modify a flowID of a packet (and/or its corresponding tasks) after the packet has been received by network processor 100. When a packet is received by network processor 100, MPP 200 (e.g., MTIE 214 and PQM 208) performs initial operations (e.g., at step 404 of FIG. 4) when a data packet is received, for example, to determine the input packet size, update data structures associated with the input packet, determine packet parameter data and other control data associated with the input packet. Such initial operations might typically be independent of the flowID of the input packet. To avoid reperforming such update operations if a packet is reassigned to another flowID, described embodiments employ a "reflow" operation that updates the flowID and updates the packet order in the OUL.

Thus, MTIE 214 might determine or update the flowID of the received packet at some point after the initial operations described above are performed. MTIE 214 might then issue the reflow instruction with a new flowID to the various submodules of MPP 200 (or other cores or accelerators of network processor 100). In response to the reflow instruction, the OUL is updated (or all OULs, if multiple OULs are employed) such that the sequence number is changed to the newest one (e.g., the packet ordering is updated) and the flowID is updated to the new value included in the reflow operation. The various submodules of MPP 200 retain the corresponding state data and do not need to reperform the initial operations that are not dependent upon the flowID value.

Figure 5:
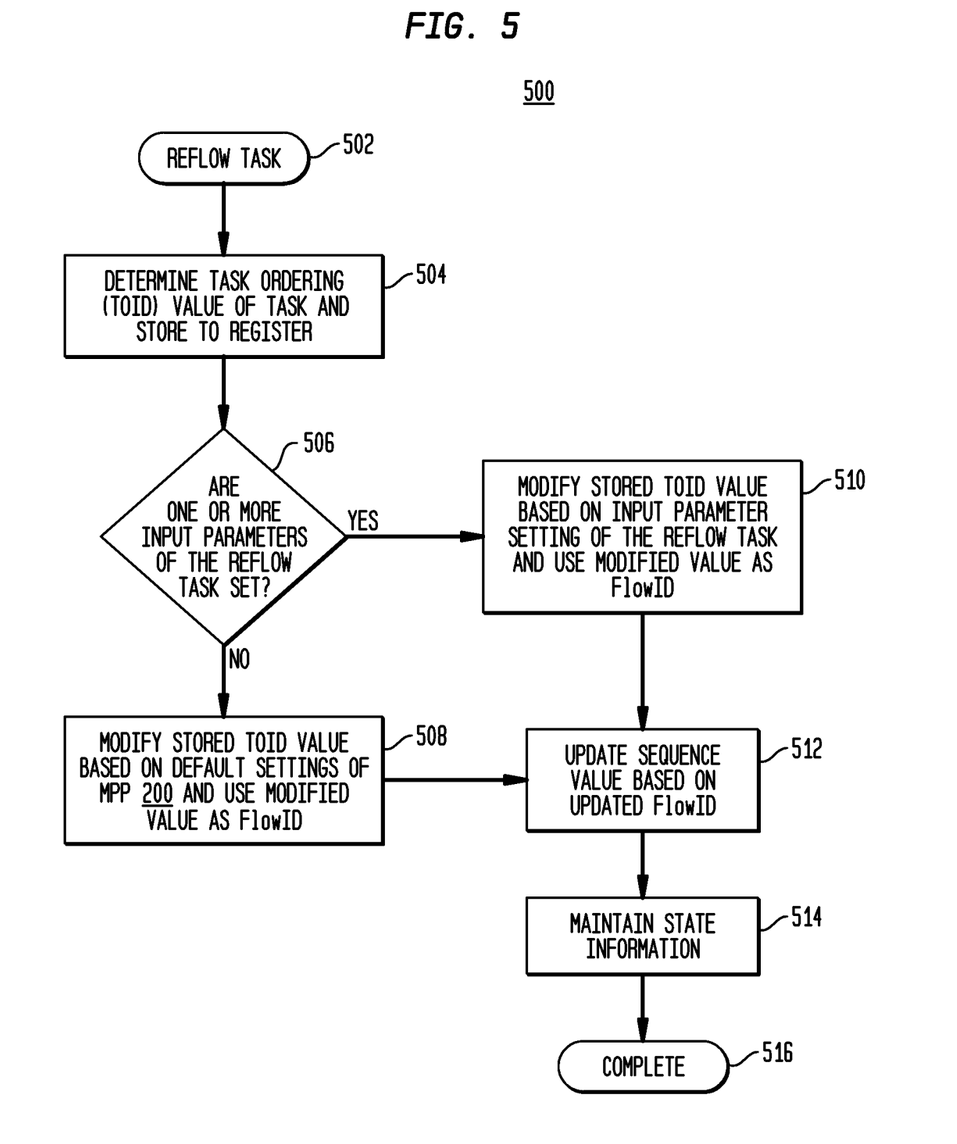
FIG. 5 shows a flow diagram of a reflow operation of the packet processor of FIG. 2 in accordance with exemplary embodiments.

FIG. 5 shows a flow diagram of the reflow operation of MPP 200. At step 502, reflow operation 500 begins when MPP 200 determines that the flowID value of the corresponding packet might need to be updated. At step 504, a task ordering ID (TOID) value of a reflow task received by MPP 200 is determined and the TOID value is stored to a register of MPP 200. At step 506, if one or more input parameters of the task are set, then at step 510 the stored TOID value is modified based on the set input parameters, an associated TOID mask value and an associated TOID shift value. The modified value is employed as the flowID of the packet. If, at step 506, the one or more input parameters of the task are not set, then at step 508 the stored TOID value is modified based on a default TOID mask value and TOID shift value of MPP 200. The modified value is employed as the flowID of the packet. At step 512, the sequence value of the packet is updated in OUL 300 based upon the updated flowID value. For example, to ensure correct packet ordering, the packet having the updated flowID is made the newest packet of the corresponding flow (e.g., has the highest sequence number for the given flowID value). At step 514, other state data corresponding to the packet having the updated flowID is maintained in associated submodules and data structures of MPP 200 and does not need to be redetermined for the updated flowID value (e.g., input packet size, packet parameter data and other control data associated with the input packet determined at step 404 of FIG. 4). At step 516, reflow process 500 completes.

For example, at step 510, in an exemplary embodiment, the task includes an input parameter valid indicator to indicate that one or more of the input parameters is set. The task might also contain a select value that indicates which byte(s) of the input parameters to employ in modifying the flowID value. The TOID shift value might indicate a number of bits by which to shift the TOID value and a direction in which to perform the shift. The TOID mask value might be a mask value employed to select which bits of the original TOID value (e.g., by a bitwise AND operation) to employ in determining the flowID value. In some embodiments, the select value might be a single byte having the format ParamSelect [7:0] where ParamSelect[7] determines whether to employ a 12-bit flowID from a default set of MPP 200 or whether to modify the 12-bit default set to have least significant bits (LSBs) set to the values stored in ParamSelect[5:0]. ParamSelect[6] specifies whether to use the default TOID Mask[11:0] and TOID shift[3:0] values of MPP 200 or whether to modify the TOID Mask and TOID shift values based on the input parameter. For example, {TOID Mask[11:0], TOID shift[3:0]} might be set to {Parameter1[7:0]+Parameter2[7:4], Parameter2[3:0]}. If the input parameter valid indicator is not set, the default TOID Mask, TOID shift and flowID set values of MPP 200 might be employed.

Thus, as described herein, described embodiments classify packets received by a network processor. A processing module of the network processor generates tasks corresponding to each received packet. A packet classification processor determines, independent of a flow identifier of the received task, control data corresponding to each task. A multi-thread instruction engine processes threads of instructions corresponding to received tasks, each task corresponding to a packet flow of the network processor and maintains a thread status table and a sequence counter for each flow. Active threads are tracked by the thread status table, and each status entry includes a sequence value and a flow value identifying the flow. Each sequence counter generates a sequence value for each thread by incrementing the sequence counter each time processing of a thread for the associated flow is started, and decrementing the sequence counter each time a thread for the associated flow is completed. A lower relative sequence value indicates an earlier started thread for the flow. The multi-thread instruction engine processes instructions in the order in which the threads were started for each flow, without head-of-line blocking among flows. A reflow operation modifies the flow value of a thread after the task is received by the packet classification processor, while maintaining the control data corresponding to the received task. The sequence value of the reflowed task is updated corresponding to the modified flow value.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in non-transitory tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. Unless explicitly stated otherwise, each numerical value and range should be interpreted as being approximate as if the word "about" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A packet classification processor for a network processor having a plurality of processing modules and at least one shared memory, wherein the network processor generates one or more tasks corresponding to each of a plurality of received packets and provides the tasks to the packet classification processor, the packet classification processor comprising:
   one or more processing modules each configured to determine, independent of a flow identifier of the received task, control data corresponding to the received task;
   a multi-thread instruction engine configured to process one or more threads of instructions, each thread of instructions corresponding to received tasks, each task corresponding to a packet flow of the network processor;
   the packet classification processor configured to maintain:
      a thread status table having N status entries, configured to track up to N active threads, where N is a positive integer, and wherein each status entry corresponds to a task, and each status entry comprises a sequence value and a flow value identifying the corresponding flow, and
      a sequence counter configured to generate a sequence value for each thread of each flow, wherein the sequence counter is incremented each time processing of a thread for a flow is started by the multi-thread instruction engine, and the sequence counter is decremented each time a thread for a flow is completed by the multi-thread instruction engine, whereby a lower relative sequence value indicates an earlier started thread for each flow;

the multi-thread instruction engine further configured to:
process instructions in the order in which the threads were started for each flow, without head-of-line blocking among flows;
perform a reflow operation, the reflow operation configured to (i) modify the flow value of a thread after the task is received by the packet classification processor, (ii) maintain the control data corresponding to the received task, and (iii) update the sequence value of the task corresponding to the modified flow value.

2. The apparatus of claim 1, wherein the control data corresponding to each received task comprises a size of the corresponding packet, parameter data associated with the received task and control data associated with the corresponding packet.

3. The apparatus of claim 1, wherein the reflow operation is configured to modify the flow value of the thread and the sequence value of the task by updating the sequence value and the flow value of an entry of the thread status table corresponding to the thread.

4. The apparatus of claim 1, wherein the sequence value is updated to a highest sequence value of the corresponding thread.

5. The apparatus of claim 1, wherein the reflow operation is configured to reorder the thread such that a thread having a modified flow value is set to be a relative newest thread of the flow.

6. The apparatus of claim 1, wherein the thread indicator value of an oldest thread of each flow of the thread status table has a corresponding sequence value equal to 0 for each flow.

7. The apparatus of claim 1, wherein the reflow operation comprises:
a parameter valid indicator configured to indicate that one or more task parameters are set; and
a select value configured to indicate one or more segments of the task parameters to employ in modifying the flow value.

8. The apparatus of claim 7, wherein:
the packet classification processor comprises:
a default shift value to indicate a number of bits by which to shift the flow value;
a default flow value set; and
a default mask value to indicate which bits of the flow value to employ, wherein the mask value modifies the flow value by a bitwise AND operation; and
the task parameters comprise:
an input shift value to indicate a number of bits by which to shift the flow value;
and input flow value set; and
an input mask value to indicate which bits of the flow value to employ, wherein the mask value modifies the flow value by a bitwise AND operation.

9. The apparatus of claim 8, wherein the packet classification processor is configured to determine, based on the select value, whether to employ (i) the default shift value or the input shift value, (ii) the default flow value set or the input flow value set, and (iii) the default mask value or the input mask value.

10. A method of classifying packets received by a network processor having a plurality of processing modules and at least one shared memory, the method comprising:
generating, by at least one of the plurality of processing modules, one or more tasks corresponding to each of a plurality of received packets and providing the tasks to a packet classification processor;
determining, by the packet classification processor independent of a flow identifier of the received task, control data corresponding to the received task;
processing, by a multi-thread instruction engine, one or more threads of instructions, each thread of instructions corresponding to received tasks, each task corresponding to a packet flow of the network processor;
maintaining (i) a thread status table having N status entries, where N is a positive integer, and (ii) a sequence counter for each flow;
tracking up to N active threads by the thread status table, wherein each status entry corresponds to an active thread, and each status entry comprises a sequence value and a flow value identifying the corresponding flow;
generating, by each sequence counter, a sequence value for each thread by the steps of:
incrementing the sequence counter each time processing of a thread for the associated flow is started by the multi-thread instruction engine, and
decrementing the sequence counter each time a thread for the associated flow is completed by the multi-thread instruction engine, whereby a lower relative sequence value indicates an earlier started thread for the flow;
processing, by the multi-thread instruction engine, instructions in the order in which the threads were started for each flow, without head-of-line blocking among flows; and
performing a reflow operation, the reflow operation comprising:
modifying the flow value of a thread after the task is received by the packet classification processor;
maintaining the control data corresponding to the received task; and
updating the sequence value of the task corresponding to the modified flow value.

11. The method of claim 10, wherein the control data corresponding to each received task comprises a size of the corresponding packet, parameter data associated with the received task and control data associated with the corresponding packet.

12. The method of claim 10, wherein the reflow operation comprises:
modifying the flow value of the thread and the sequence value of the task by updating the sequence value and the flow value of an entry of the thread status table corresponding to the thread.

13. The method of claim 10, wherein the reflow operation comprises:
updating the sequence value to a highest sequence value of the corresponding thread.

14. The method of claim 10, wherein the reflow operation comprises:
reordering the thread such that a thread having a modified flow value is set to be a relative newest thread of the flow.

15. The method of claim 10, wherein the thread indicator value of an oldest thread of each flow of the thread status table has a corresponding sequence value equal to 0 for each flow.

16. The method of claim 10, wherein, for the method, the reflow operation comprises:
a parameter valid indicator configured to indicate that one or more task parameters are set; and
a select value configured to indicate one or more segments of the task parameters to employ in modifying the flow value.

17. The method of claim 16, wherein, for the method:
the packet classification processor comprises:
- a default shift value to indicate a number of bits by which to shift the flow value;
- a default flow value set; and
- a default mask value to indicate which bits of the flow value to employ, wherein the mask value modifies the flow value by a bitwise AND operation; and the task parameters comprise:
- an input shift value to indicate a number of bits by which to shift the flow value;
- and input flow value set; and
- an input mask value to indicate which bits of the flow value to employ, wherein the mask value modifies the flow value by a bitwise AND operation.

18. The method of claim 17, further comprising:
determining, by the packet classification processor, based on the select value, whether to employ (i) the default shift value or the input shift value, (ii) the default flow value set or the input flow value set, and (iii) the default mask value or the input mask value.

19. A non-transitory machine-readable medium, having encoded thereon program code, wherein, when the program code is executed by a machine, the machine implements a method of classifying packets received by a network processor having a plurality of processing modules and at least one shared memory, the method comprising:
- generating, by at least one of the plurality of processing modules, one or more tasks corresponding to each of a plurality of received packets and providing the tasks to a packet classification processor;
- determining, by the packet classification processor independent of a flow identifier of the received task, control data corresponding to the received task;
- processing, by a multi-thread instruction engine, one or more threads of instructions, each thread of instructions corresponding to received tasks, each task corresponding to a packet flow of the network processor;
- maintaining (i) a thread status table having N status entries, where N is a positive integer, and (ii) a sequence counter for each flow;
- tracking up to N active threads by the thread status table, wherein each status entry corresponds to an active thread, and each status entry comprises a sequence value and a flow value identifying the corresponding flow;
- generating, by each sequence counter, a sequence value for each thread by the steps of:
  - incrementing the sequence counter each time processing of a thread for the associated flow is started by the multi-thread instruction engine, and
  - decrementing the sequence counter each time a thread for the associated flow is completed by the multi-thread instruction engine, whereby a lower relative sequence value indicates an earlier started thread for the flow;
- processing, by the multi-thread instruction engine, instructions in the order in which the threads were started for each flow, without head-of-line blocking among flows; and
- performing a reflow operation, the reflow operation comprising:
  - modifying the flow value of a thread after the task is received by the packet classification processor;
  - maintaining the control data corresponding to the received task; and
  - updating the sequence value of the task corresponding to the modified flow value.

20. The non-transitory machine-readable medium of claim 19, wherein the control data corresponding to each received task comprises a size of the corresponding packet, parameter data associated with the received task and control data associated with the corresponding packet.

* * * * *